United States Patent
Travis

(10) Patent No.: US 9,563,269 B2
(45) Date of Patent: Feb. 7, 2017

(54) SCANNING LIQUID-CRYSTAL DISPLAY BACKLIGHT

(71) Applicant: MICROSOFT TECHNOLOGY LICENSING, LLC, Redmond, WA (US)

(72) Inventor: Adrian Travis, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/224,850

(22) Filed: Mar. 25, 2014

(65) Prior Publication Data

US 2015/0277551 A1 Oct. 1, 2015

(51) Int. Cl.
| | |
|---|---|
| G06G 5/00 | (2006.01) |
| G02F 1/1333 | (2006.01) |
| G06F 3/01 | (2006.01) |
| G02B 5/32 | (2006.01) |
| G02F 1/1335 | (2006.01) |
| F21V 8/00 | (2006.01) |

(52) U.S. Cl.
CPC .......... G06F 3/013 (2013.01); G02B 5/32 (2013.01); G02B 6/0035 (2013.01); G02B 6/0066 (2013.01); G02F 1/133615 (2013.01); G02F 1/133621 (2013.01); G02B 6/0068 (2013.01); G02F 2001/133623 (2013.01)

(58) Field of Classification Search
CPC ..... G02B 27/26; G02B 27/286; G02B 6/0056; H01S 5/0687; G06F 3/013
USPC .......... 345/156; 362/31; 349/65, 117; 372/32
See application file for complete search history.

(56) References Cited

U.S. PATENT DOCUMENTS

| | | |
|---|---|---|
| 6,407,724 B2 | 6/2002 | Waldern et al. |
| 6,831,678 B1 | 12/2004 | Travis |
| 8,354,806 B2 | 1/2013 | Travis et al. |
| 8,477,261 B2 * | 7/2013 | Travis et al. ............ 349/65 |
| 8,582,206 B2 | 11/2013 | Travis |
| D705,246 S | 5/2014 | Ranz et al. |

(Continued)

FOREIGN PATENT DOCUMENTS

WO 2011022342 A2 2/2011

OTHER PUBLICATIONS

Takahashi, Dean, "Vuzix Develops Google Glass-Like Smart Glasses—but with Superior Optics and Standard Eye Frames", Published on: Dec. 10, 2013, Available at: http://venturebeat.com/2013/12/10/vuzix-has-google-glass-like-smart-glasses-but-with-superior-optics/, 4 pages.

(Continued)

Primary Examiner — Andrew Sasinowski
Assistant Examiner — Kuo Woo
(74) Attorney, Agent, or Firm — Brandon Roper; Judy Yee; Micky Minhas

(57) ABSTRACT

A display includes an optical waveguide with opposing front and back faces, an injection optic, and volume hologram arranged on or within the waveguide. The injection optic is configured to inject light into the waveguide at a variable injection angle, which influences the reflection angle at which the light reflects from the front and back faces on propagating through the waveguide. The hologram is configured to release, in a predetermined direction, a portion of the light from the waveguide when excited at a predetermined reflection angle.

20 Claims, 9 Drawing Sheets

(56) References Cited

U.S. PATENT DOCUMENTS

| | | |
|---|---|---|
| 2003/0067760 A1* | 4/2003 | Jagt et al. .................. 362/31 |
| 2004/0131095 A1* | 7/2004 | Ohshima ............... H01S 5/0687 |
| | | 372/32 |
| 2006/0126142 A1 | 6/2006 | Choi |
| 2009/0190070 A1 | 7/2009 | Nagata et al. |
| 2012/0299808 A1 | 11/2012 | Lee et al. |
| 2013/0222384 A1 | 8/2013 | Futterer |

OTHER PUBLICATIONS

Schwerdtner, et al., "Eye-Tracking Solutions for Real-Time Holographic 3-D Display", In Proceedings of Symposium Digest of Technical Papers, vol. 39, May 2008, 3 pages.

Davis, et al., "Analog, Non-Mechanical Beam-Steerer with 80 Degree Field of Regard", In Proceedings of SPIE Defense and Security Symposium, vol. 6971 69710G-1, Apr. 2008, 11 pages.

ISA European Patent Office, International Search Report and Written Opinion issued in Application No. PCT/US2015/021620, Jun. 5, 2015, Netherlands, 12 Pages.

IPEA European Patent Office, International Preliminary Report on Patentability Issued in Application No. PCT/US2015/021620, Oct. 16, 2015, WIPO, 7 pages.

\* cited by examiner

SCANNING LIQUID-CRYSTAL DISPLAY BACKLIGHT

BACKGROUND

A wide range of digital display systems incorporate liquid-crystal display (LCD) technology. LCD displays are found in smartphones, tablet and laptop computers, and in video monitors for televisions and desktop computers. A typical LCD display includes an image-forming, liquid-crystal layer positioned in front of a backlight.

Ideally the LCD backlight should emit enough light to make the display viewable in bright ambient conditions. A highly emissive backlight, however, may consume excessive power. In smartphones and tablet computers, for instance, the power to operate the LCD backlight may be a significant fraction of the overall power budget. As a result, tablets and smartphones must be designed with relatively thick, relatively heavy batteries, or be subject to frequent recharge, which shortens lifetime. In a stationary display, excessive power consumption by the LCD backlight increases operating costs, makes the system less environmentally compliant, and may cause unwanted heating

SUMMARY

This disclosure provides, in one embodiment, a display. The display includes an optical waveguide with opposing front and back faces, an injection optic, and a hologram arranged on or within the waveguide. The injection optic is configured to inject light into the waveguide at a variable injection angle, which influences the reflection angle at which the light reflects from the front and back faces on propagating through the waveguide. The hologram is configured to release a portion of the light from the waveguide when excited at a predetermined reflection angle.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
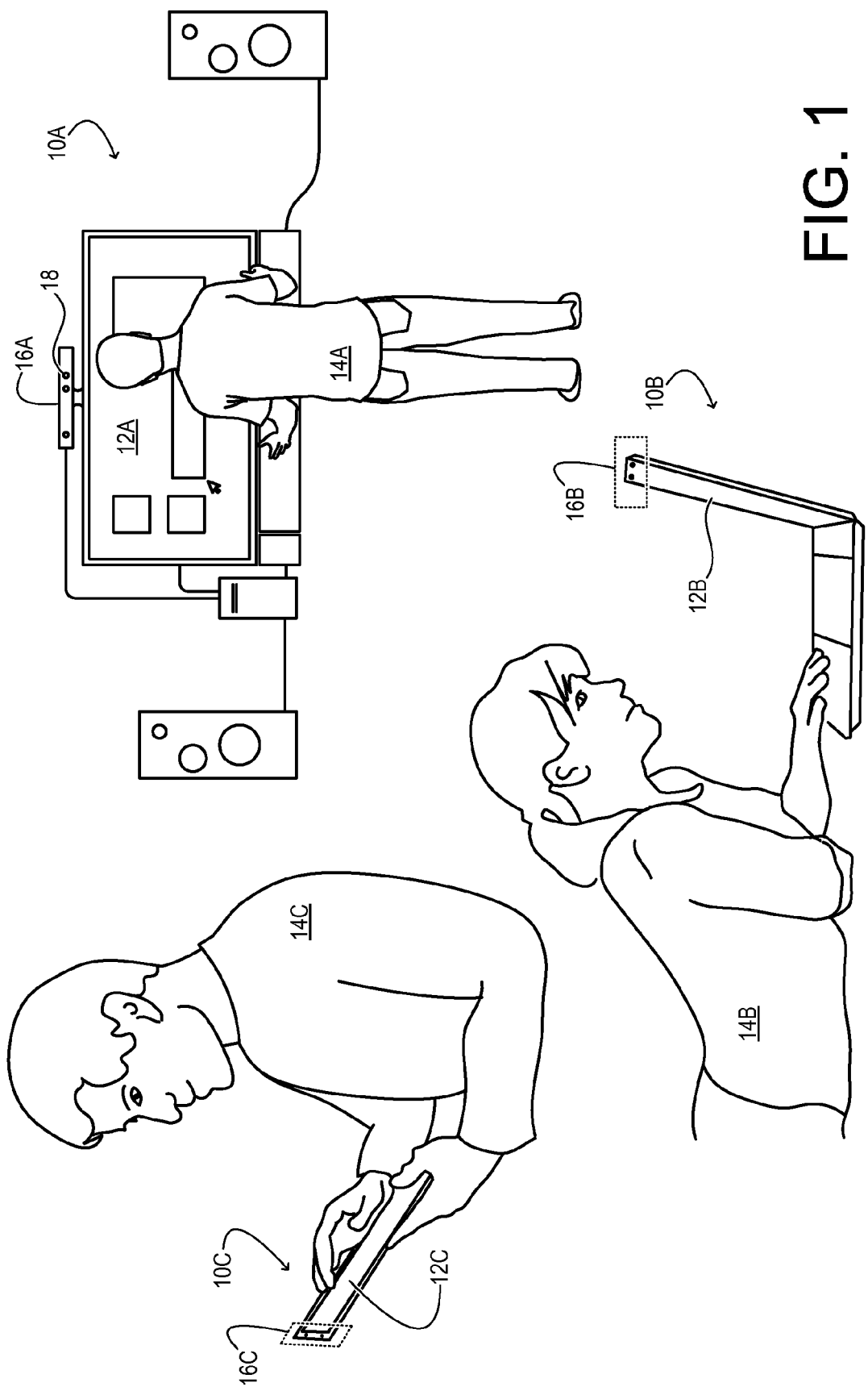
FIG. 1 shows aspects of example computer systems, each having an LCD display.

Aspects of this disclosure will now be described by example and with reference to the illustrated implementations listed above. Components, process steps, and other elements that may be substantially the same in one or more implementations are identified coordinately and described with minimal repetition. It will be noted, however, that elements identified coordinately may also differ to some degree. It will be further noted that the drawing figures included in this disclosure are schematic and generally not drawn to scale. Rather, the various drawing scales, aspect ratios, and numbers of components shown in the figures may be purposely distorted to make certain features or relationships easier to see.

The problem solved by this disclosure is one of excessive power consumption by a backlight of an LCD display. Existing backlight systems direct light through an image-forming liquid-crystal layer over a wide range of incidence angles. This tactic ensures that the display is viewable over a wide range of viewing angles. At any given time, however, a display can only be viewed by a finite number of viewers, through a finite number of anatomical pupils, which have finite size. With existing displays, only a small fraction of the available display light is received into the pupils; the remaining light is wasted. Accordingly, the power input to an LCD display may be better utilized by concentrating the display light into the viewer's pupils, and emitting less light elsewhere. In this way, the overall luminous output of the backlight can be reduced, while maintaining the viewer's perception of brightness.

FIG. 1 shows aspects of three different computer systems—10A, 10B, 10C—each having an LCD display viewable to a user. Display 12A is a large-format display of a home-entertainment system 10A. Display 12B is a wide-screen display of a laptop computer system 10B. Display 12C is a very thin LCD display integrated in a tablet computer system 10C. The laptop and tablet computer systems may be powered by rechargeable batteries (not shown in the drawings).

Each computer system of FIG. 1 is equipped with a corresponding imaging system—16A, 16B, 16C. Each imaging system includes one or more cameras 18 oriented so as to image the face of the user—14A, 14B, 14C—when the user is viewing the display. In the case of laptop computer system 10B and tablet computer system 10C, the imaging systems may include one or more rear-facing cameras arranged beneath a bezel of the display. Home-entertainment system 10A is equipped with a peripheral imaging system 16A. The peripheral imaging system may include multiple co-registered cameras—e.g., a depth camera and one or more color cameras, as further described below.

In some implementations, the imaging system may be configured to acquire a time-resolved sequence of depth maps. The term 'depth map' refers to an array of pixels registered to corresponding regions $(X_i, Y_i)$ of an imaged subject, with a depth value $Z_i$ indicating, for each pixel, the depth of the corresponding region. 'Depth' is defined as a coordinate parallel to the optical axis of the imaging system, which increases with increasing distance from the cameras. Operationally, an imaging system may be configured to acquire two-dimensional image data from which a depth map is obtained via downstream processing.

The nature of depth imaging may differ in the various implementations of this disclosure. In one implementation, brightness or color data from two, stereoscopically oriented imaging arrays may be co-registered and used to construct a depth map. In other implementations, a depth camera may be configured to project onto the subject a structured infrared (IR) or near-IR (NIR) illumination pattern comprising numerous discrete features—e.g., lines or dots. An imaging array in the depth camera may be configured to image the structured illumination reflected back from the subject. Based on the spacings between adjacent features in the various regions of the imaged subject, a depth map of the subject may be constructed. In still other implementations, the depth camera may project a pulsed illumination towards the subject. A pair of imaging arrays may be configured to detect the pulsed illumination reflected back from the subject. Both arrays may include an electronic shutter synchronized to the pulsed illumination, but the integration times for the arrays may differ, such that a pixel-resolved time-of-flight (TOF) of the pulsed illumination, from the illumination source to the subject and then to the arrays, is discernible based on the relative amounts of light received in corresponding elements of the arrays. A TOF depth-sensing camera that measures the phase shift between transmitted and reflected light may also be used.

A color camera of any imaging system may image visible light from the observed subject in a plurality of channels—e.g., red, green, blue, etc.—mapping the imaged light to an array of pixels. Alternatively, a monochromatic camera may be used, which images the light in grayscale. In one implementation, the depth and color cameras of an imaging system may have the same resolutions. Even when the resolutions differ, the pixels of the color camera may be registered to those of the depth camera. In this way, both color and depth information may be assessed for each portion of the subject.

Whenever multiple implementations are presented in this disclosure, any feasible combination or subcombination of features from different implementations also lies within the scope of the disclosure. For instance, a peripheral depth camera may be paired with a tablet computer system, or an integrated rear-facing camera with a home-entertainment system display. Furthermore, the range of computer systems and associated displays of FIG. 1 should not be construed to limit the scope of this disclosure. The display technology presented herein may be used with LCD displays of any form factor, and may be associated with display-driving devices of any description. The components of a system that includes a camera detecting light in the visible range, a camera that senses depth, and a display may be integrated in one device or on a common substrate.

Figure 2:
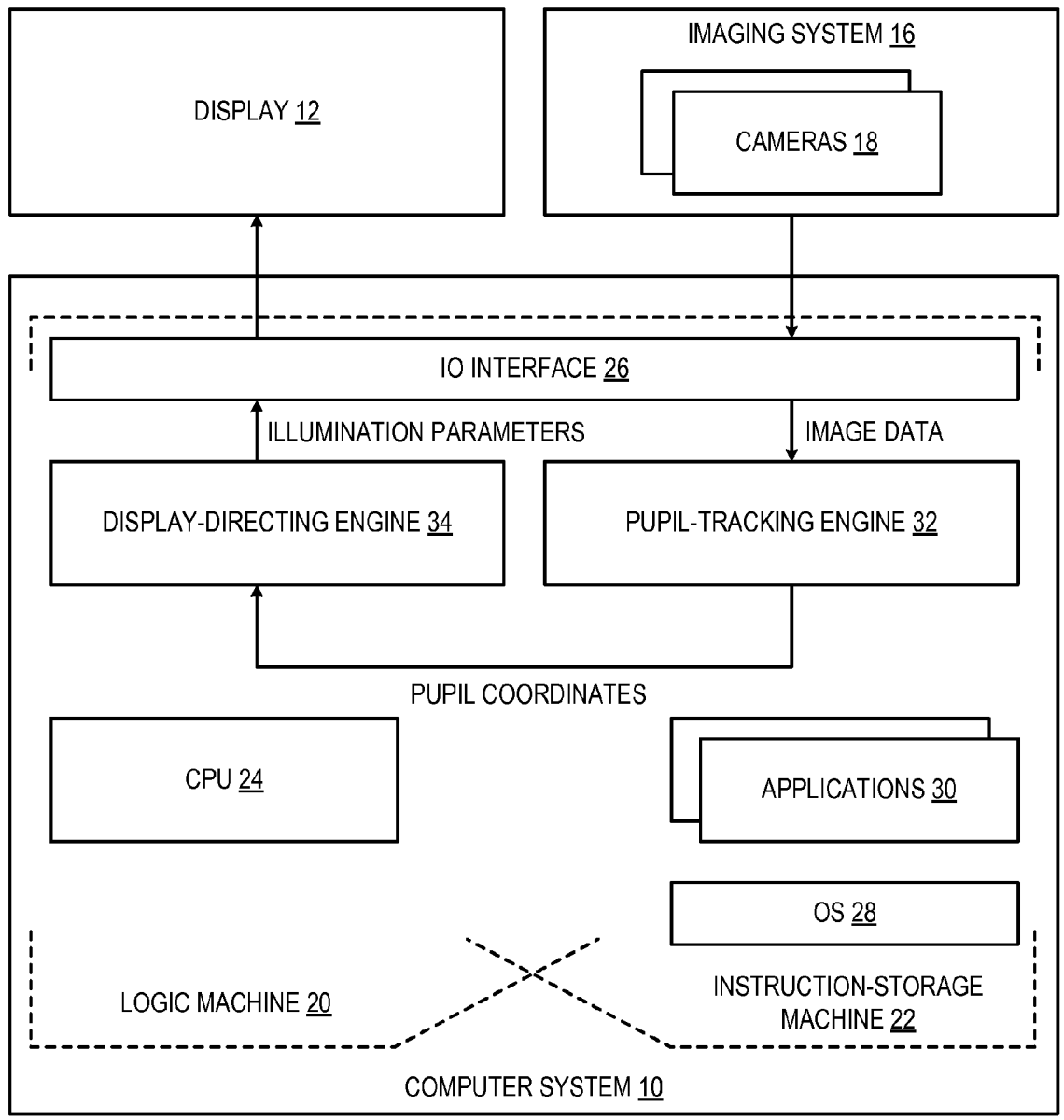
FIG. 2 shows aspects of an example computer system operatively coupled to an imaging system and to an LCD display.

FIG. 2 shows additional aspects of an example computer system 10, LCD display 12, and imaging system 16. The computer system includes a logic machine 20 and an instruction-storage machine 22. The logic machine may optionally include a central processing unit (CPU) 24, an input/output (IO) interface 26, and various other componentry. The instruction-storage machine may include random access memory and/or non-volatile storage that optionally supports an operating system (OS) 28 and applications 30. Taken together, the logic machine and the instruction-storage machine instantiate inter alia a pupil-tracking engine 32 and a display-directing engine 34. Additional aspects of computer system 10 are described hereinafter.

Pupil-tracking engine 32 is configured to receive image data from imaging system 16 and to identify, based on the image data, one or more anatomical pupils of one or more viewers sighting LCD display 12. In one implementation, two anatomical pupils may be identified for each viewer. Naturally, the process of image acquisition and pupil identification may be repeated so as to track any movement of the pupils relative to the LCD display.

The operational details of pupil identification and tracking may differ in the different implementations of this disclosure. In one implementation, image data from imaging system 16 may be processed to resolve such features as the pupil center, pupil outline, iris, and/or one or more specular glints from a cornea of a viewer's eye. The locations of such features in the image data may be used as input parameters in a model—e.g., a polynomial model that provides suitable pupil coordinates in a frame of reference relative to display 12.

Accordingly, the pupil-tracking engine 32 may be configured to compute the coordinates of each of N pupils sighting the display (N=2, 4, 6, etc.) and to maintain the coordinates in any appropriate data structure. In implementations in which the imaging system includes a depth camera or pair of stereo cameras capable of resolving pupil depth, the data structure may define three coordinates for each pupil i—e.g., $X_i$, $Y_i$, $Z_i$ for $1<i<N$. In other implementations, the depth coordinate $Z_i$ may be unavailable, and the data structure may only define coordinates $X_i$ and $Y_i$ relative to a plane parallel to display 12. It will be noted, however, that a suitable depth coordinate may be estimated based on 2D image data together with an accurate camera model. In some implementations, the depth coordinate may be estimated based on apparent distance between a viewer's pupils. For example, the depths of a viewer's pupils $Z_i$ and $Z_j$ may be assumed to increase with decreasing pupil separation, $X_i$-$X_j$, in the acquired image.

Continuing in FIG. 2, display-directing engine 34 is configured to receive from pupil-tracking engine 32 the data structure defining the coordinates of the N identified pupils. The display-directing engine then computes, based on the coordinates, a plurality of illumination parameters to be supplied as input to LCD display 12. In some implementations, illumination parameters may specify a direction of release of display light from the display. Accordingly, receipt of the appropriate illumination parameters by the LCD display may have the effect of concentrating light emission from the display toward the N identified pupils and causing less light to be directed elsewhere, as further described below. Although FIG. 2 refers to pupil coordinates and illumination parameters specifically, this feature will not be construed to limit the scope of the disclosure. Rather, any viewer data responsive to the viewer's pupil coordinates may be furnished by the pupil tracking engine and received in the display-directing engine. Likewise, any directing data responsive to the viewer data and influencing the direction of release of light from the display may be furnished by the display directing engine and received in the LCD display.

In some implementations, LCD display 12 is divided area-wise into a plurality of display zones, with one or more illumination parameters specified independently for each zone. In these implementations, the illumination parameters specify a direction for release of display light from the associated zone. The illumination parameters, as noted above, depend on the identified pupil positions and change with changing pupil positions. Moreover, the illumination parameters may differ for different display zones of the same display. In a more particular implementation, illumination parameters for a given display zone may specify whether light is to be emitted from that display zone, and if so, the direction of the light to be emitted.

Figure 3:
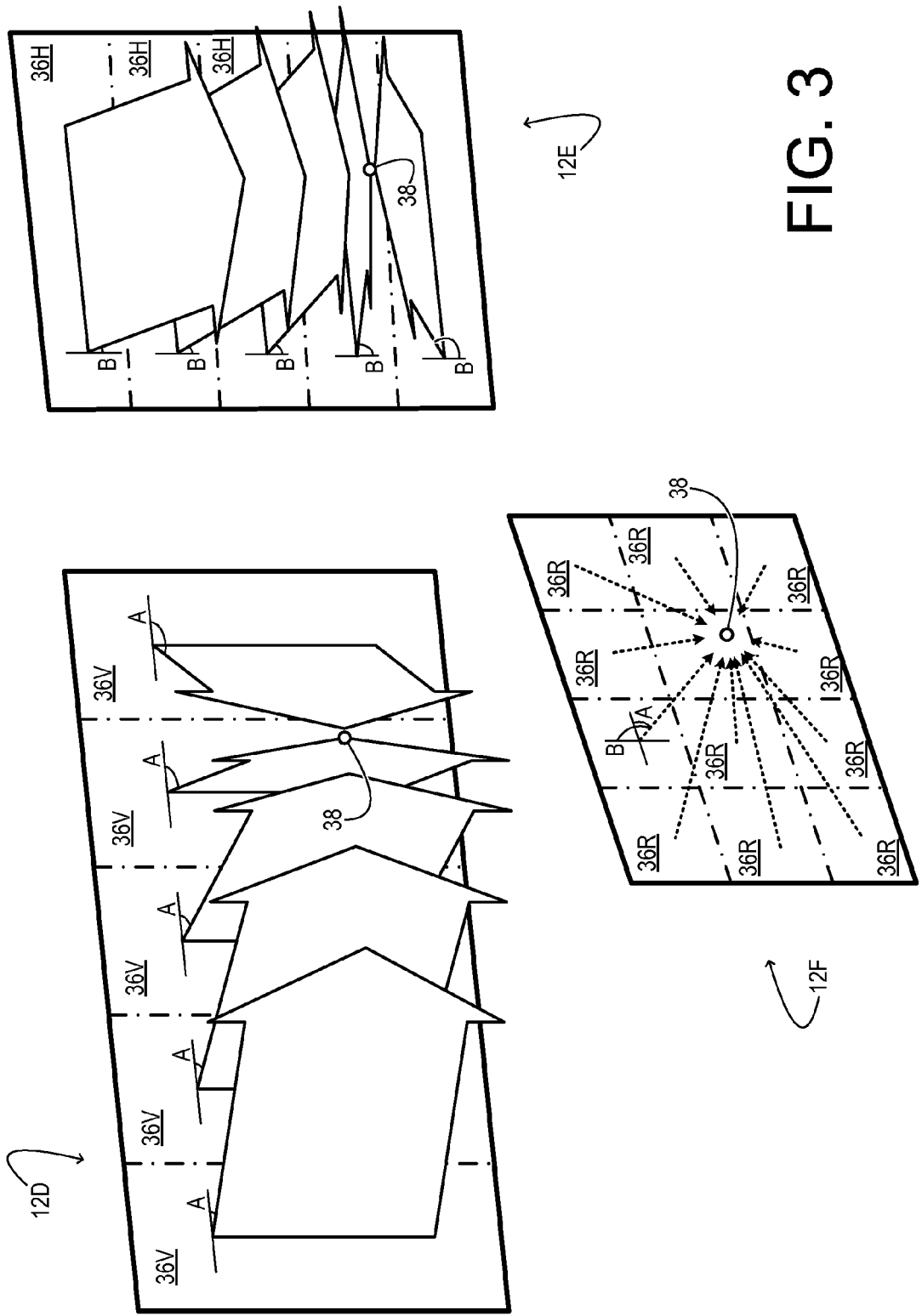
FIG. 3 shows example arrangements of display zones for different LCD displays.

FIG. 3 shows example arrangements of display zones 36 for three different displays—12D, 12E, and 12F. In widescreen display 12D, each display zone 36V is a vertical column that runs the height of the display; an illumination parameter for each zone specifies the horizontal-plane angle A at which light from that zone is released. In display 12E, each display zone 36H is a horizontal row that runs the width of the display; an illumination parameter for each zone specifies the vertical-plane angle B at which light from that zone is released. In display 12F, each display zone 36R is a rectangular block arranged on a grid. In this implementation, the direction of release of the light is specified by a horizontal-plane angle A and a vertical-plane angle B. It will be noted that the number of display zones shown in the drawings is provided by way of example, and that other numbers of display zones are equally consistent with this disclosure. In some examples, an LCD display may include only one display zone.

In the example scenarios illustrated in FIG. 3, display light is directed from each display zone 36 into a pupil 38 of a viewer of the corresponding display. It is to be emphasized that the direction of release of display light from each display zone 36 is variable and controllable independently for each zone via the illumination parameters supplied to the display. As such, the indicated release directions may be programmed to track changes in pupil position, and, in a time-shared sense, to direct display light to multiple pupils arranged at multiple positions relative to the display.

Figure 4:
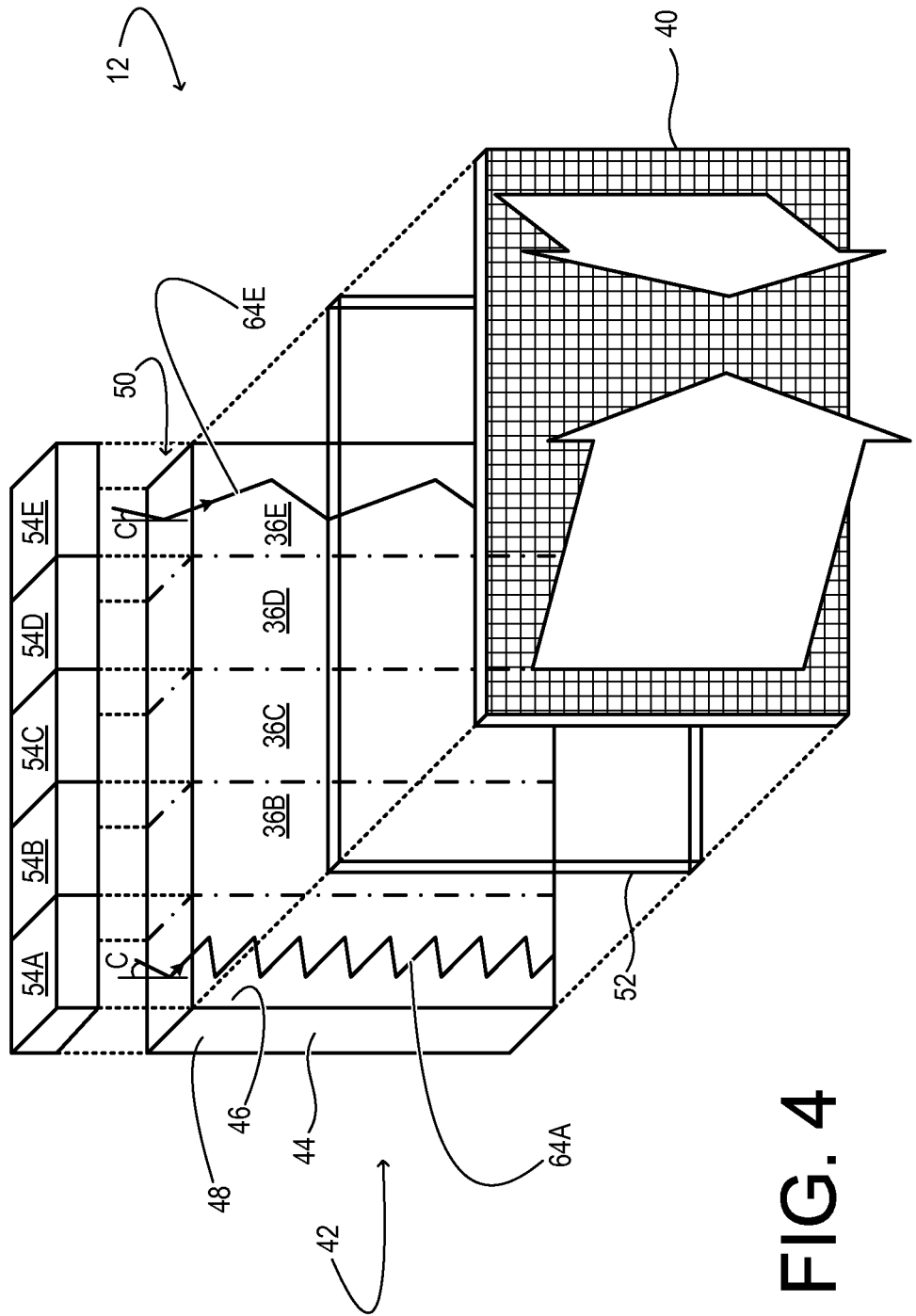
FIG. 4 shows additional aspects of an example LCD display.

FIG. 4 is a partially exploded view showing additional aspects of an LCD display 12 in one implementation. The display includes a liquid-crystal layer 40 arranged in front of a backlight 42. The backlight may be situated to direct its emission through the liquid-crystal layer, which forms a display image based on control signals from a peripheral or integrated computer system. The liquid-crystal layer includes numerous, individually addressable pixels arranged on a rectangular grid or other geometry. In some implementations, pixels transmitting red light may be juxtaposed in the matrix to pixels transmitting green and blue light, so that the LCD matrix forms a color display image.

In the implementation of FIG. 4, backlight 42 includes a rectangular-prismatic optical waveguide 44. The waveguide is made of an optically transparent material such as acrylic, polycarbonate, or glass; it has a front face 46 on the side facing liquid-crystal layer 40, a back face 48 opposite the liquid-crystal layer, and an edge face 50 through which display light is received into the waveguide. Display light received at the edge face at a suitable angle of incidence propagates through the waveguide by total internal reflection (TIR) from the front and back faces.

Backlight 42 also includes a light-extraction layer 52 supported on front face 46 in FIG. 4. In other implementations, the light-extraction layer may be supported on back face 48. More generally, the light-extraction layer may be arranged anywhere on or within the waveguide. It may be formed as a layer midway between and parallel to the front and back faces, for example, to interact with the propagating light at each crossing between front and back faces. In still other examples, the light extraction layer may extend the entire thickness of the waveguide, between the front and back faces, or any portion thereof. In the illustrated implementation, the light-extraction layer partially frustrates the TIR from the front surface and thereby promotes, at each reflection from the front surface, a release of some of the propagating light from the waveguide. The nature of the light-extraction layer may differ in the different implementations of this disclosure, and will be described hereinafter.

Generally, however, every light-extraction layer will include certain diffractive features that interact to a specified degree with the propagating light, releasing such light at a specified efficiency. Thus, by configuring a steady increase in diffraction efficiency along the direction of propagation, the effect of diminishing intensity of the propagating light can be counterbalanced, leading to a substantially uniform release of light over any portion of the propagation path, such as any or all display zones 36.

In the implementation of FIG. 4, backlight 42 is divided (spatially, not materially) into five vertical display zones 36 that run the entire height of the backlight. In other implementations, the display zones may be arranged horizontally, or in any other suitable pattern. In FIG. 4, a different injection optic 54 is provided for each of the different display zones. Each injection optic is configured to inject substantially collimated light into edge face 50 of waveguide 44, the exit pupil of the injection optic being about as wide as its associated display zone. The light output of each injection optic is actively controllable in terms of its intensity, color, and variable angle of injection into edge face 50. In general, the angle of injection may be specified in terms of two orthogonal plane angles measured relative to the normal of edge face 50—an elevation angle C in planes perpendicular to the front and back faces, and an azimuth angle (not labeled in the drawings) in planes parallel to the front and back faces. In some implementations, both the elevation angle and the azimuth angle may controllable. In implementation of FIG. 4, however, the azimuth angle is set at design time, and only the elevation angle is subject to active control. Although each injection optic of FIG. 4 injects light directly into edge face 50 of waveguide 44, various alternative configurations may be used instead. For example, edge face 50 may support a fixed mirror configured to inject light into the waveguide. The mirror may receive light from projection optics arranged along the opposite edge face of the waveguide, or elsewhere.

Figure 5:
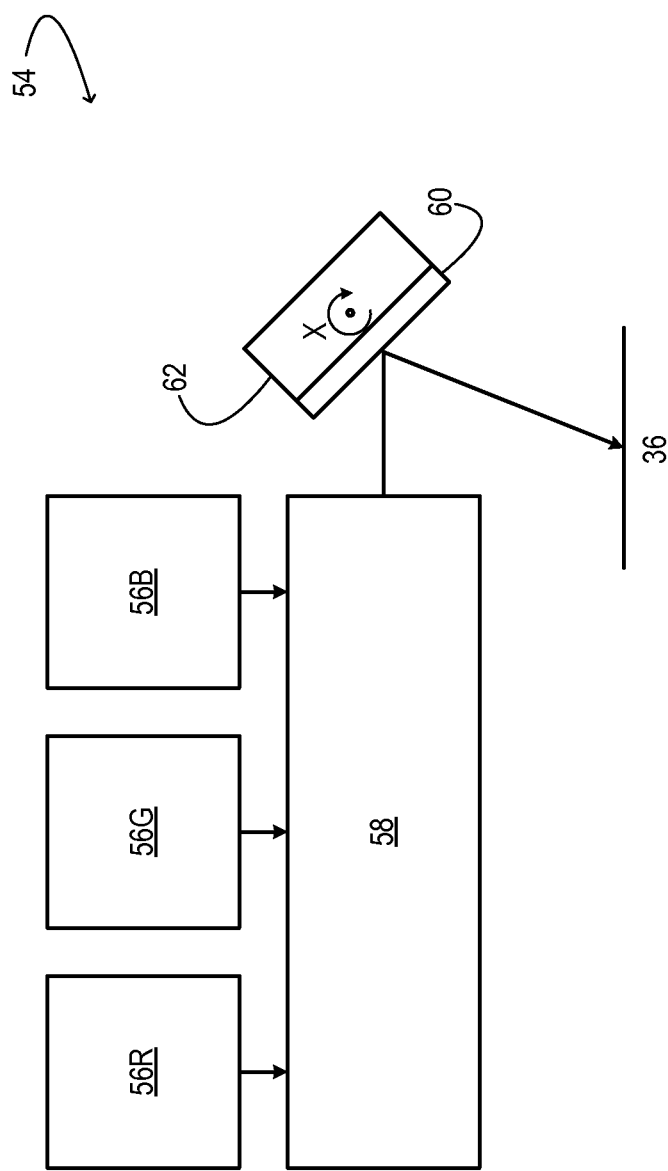
FIG. 5 shows aspects of an example injection optic of an LCD backlight.

FIG. 5 shows aspects of an example injection optic 54. The injection optic includes independently biased red, green, and blue lasers 56—diode lasers, for example—that emit coherent, collimated beams of monochromatic light. The three laser beams are received in pupil expander 58—an optic configured to expand the exit pupil of each of the laser beams substantially to the width of the associated display zone 36, effectively combining the beams.

The output from pupil expander 58 is directed to mirror 60, which is coupled to a piezoelectric mirror mount 62. In this implementation, a control voltage applied to a piezoelectric element of the mirror mount brings about a proportional deflection of the mirror about the axis marked X. The deflection of the mirror may be used to control the angle at which light is injected into waveguide 44, or more specifically, the display zone 36 associated with the injection optic. In other implementations, the mirror mount may include two piezoelectric elements to control the deflection of the mirror in two, orthogonal directions. In other implementations, the laser light may be deflected in orthogonal directions by two different mirrors, each coupled to its own piezoelectric mirror mount. In other implementations, a non-piezoelectric mechanical transducer may be used to deflect mirror 60—e.g., a transducer responsive to an applied electric or magnetic field, for example. In still other implementations, the mirror and piezoelectric mirror mount may be replaced by an electronically tunable optic configured to deflect the laser light by a controllable amount. In these and other implementations, injection optic 54 may be configured to inject red, green, and blue laser emission into a given zone at the same injection angle. In still other implementations, the injection optic may be configured to inject light from a single laser, providing a monochromatic display.

Returning to FIG. 4, the reader will note that the elevation angle C at which light is injected into waveguide 44 determines the angle at which the propagating light is incident on the front and back faces of the waveguide. In particular, a low angle of incidence on edge face 50 brings about a small number of glancing reflections 64E from the front and back faces, whereas a high angle of incidence leads to a larger number of reflections 64A, closer to the critical angle. Thus, by controlling independently for each display zone the elevation angle at which light is injected into the waveguide, one also controls the angle at which the propagating light is incident on light-extraction layer 52.

The foregoing description and drawings demonstrate that illumination parameters responsive to pupil position can be computed based on image data and used to control the angle at which light propagating through waveguide 44 is incident upon light-extraction layer 52. Moreover, a different set of illumination parameters may be furnished for each of a plurality of display zones 36 of an LCD display. The remaining drawings and description serve to illustrate how control of the incidence angle may be used to intelligently concentrate display light into the viewer's pupils.

Figure 6:
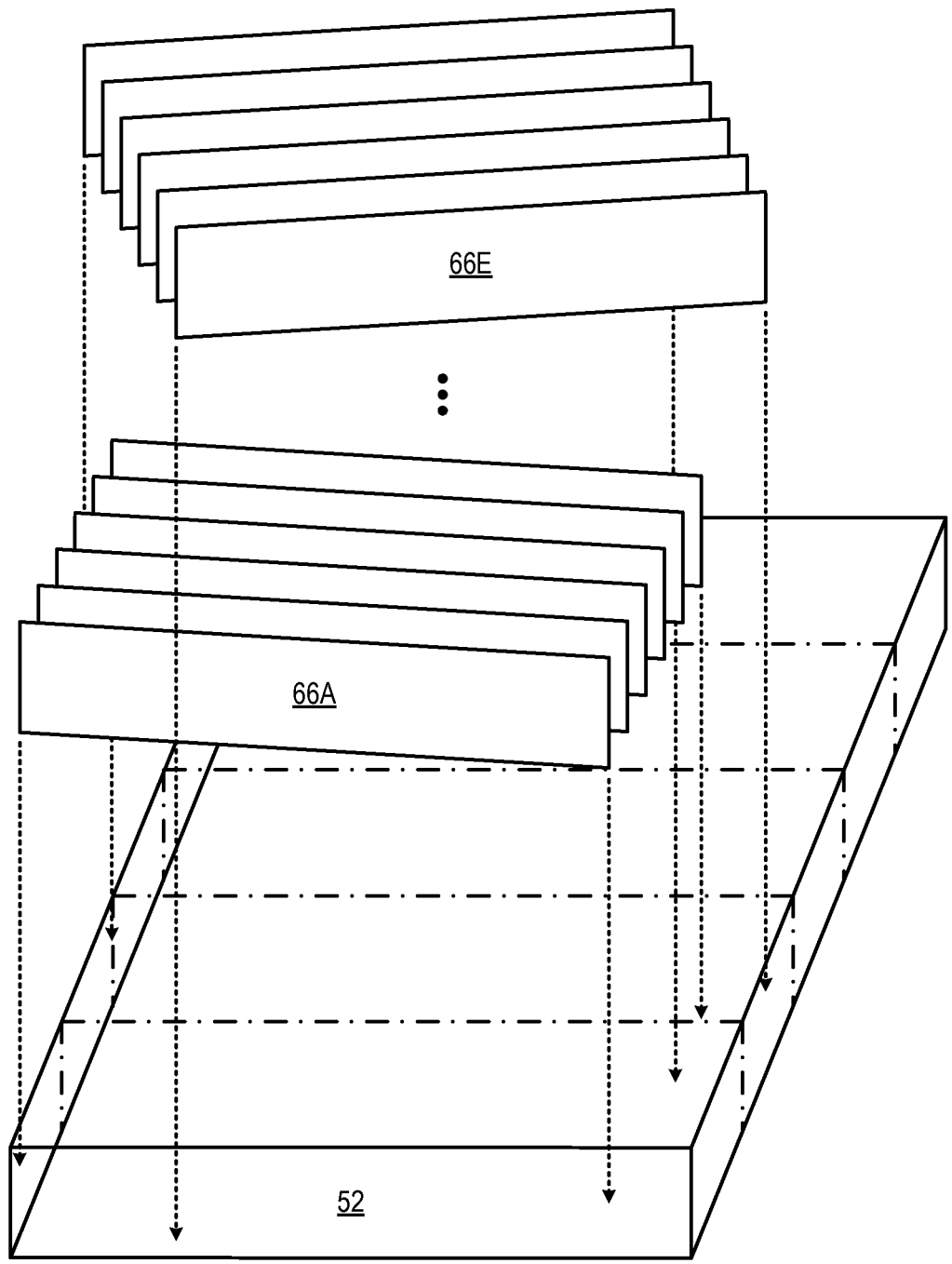
FIG. 6 represents an example light-extraction layer of an LCD backlight.

FIG. 6 provides a representation of light-extraction layer 52 in one, non-limiting implementation. As noted above, a light-extraction layer may include numerous diffractive features. The thickness of the light-extraction layer may be ten to one-hundred microns, in some examples. In the example shown in FIG. 6, the light-extraction layer includes a plurality of superimposed Bragg gratings 66, which extend across all of the display zones 36. Although the drawing shows only two Bragg gratings, a typical light-extraction layer may include one-hundred or more. The various Bragg gratings of the light-extraction layer may differ with respect to orientation and pitch.

Each Bragg grating 66 is excitable by light of a narrow wavelength band and a narrow range of incidence angles. The excitation wavelengths and angles are determined by the wavelength and orientation of the probe light used to record the Bragg grating. Outside the appropriate wavelength band or range of incidence angles, the Bragg grating is transparent—a condition that allows numerous Bragg gratings to occupy the same volume and to operate independently of each other. In other implementations, various other kinds of volume holograms may be used in lieu of the Bragg gratings. In particular, a series of volume holograms may be used, with each volume hologram diffusing light over a narrow range of angles, such that the angles addressed by the series adjoin into a continuum.

Furthermore, each Bragg grating or other volume hologram may be configured, when excited, to diffract a portion of the light propagating through the waveguide and to eject such light in a predetermined, different direction, which is selectable based on the manner in which the hologram is recorded. With the LCD display implementation of FIG. 4, the useful directions lie in horizontal planes orthogonal to the plane of display 12 and span a range of horizontal-plane angles. In one example, thirty Bragg gratings may be used for each of three wavelengths of light. Here, the horizontal-plane angles may range from 60 to 120 degrees in increments of 2 degrees. Naturally, other ranges and increments are contemplated as well. During the recording process, each angle in the series is mapped to light of a different elevation angle, which may range from the critical angle (42 degrees in polyacrylic) to a glancing angle of 5 degrees or less. Due to the action of the Bragg gratings, the injection angle at which light is injected into the waveguide influences a reflection angle at which the injected light reflects from the front and back faces on propagating through waveguide 44. In essence, the superposition of Bragg gratings in light-extraction layer 52 is used to transform the controllable elevation angle C of injection into the waveguide to an orthogonal angle of release into the air. In the illustrated scenario, at least one volume hologram in light-extraction layer 52 is configured to release light in each of the directions computed by display-directing engine 34 when excited at the appropriate injection angle.

Figure 7:
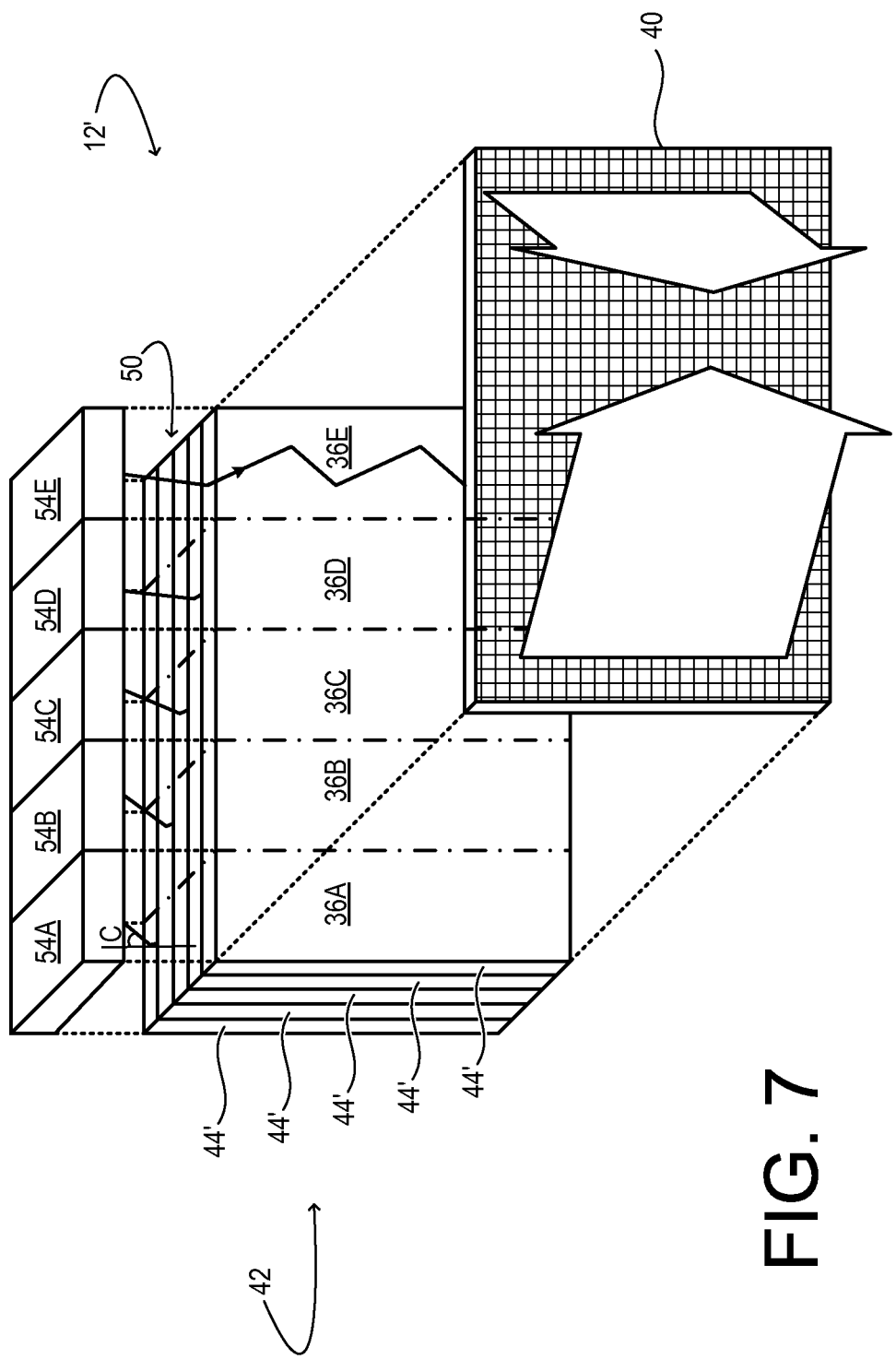
FIG. 7 shows additional aspects of another example LCD display.

FIG. 7 is a partially exploded view showing aspects of another LCD display 12'. LCD display 12' shares many of the features of LCD display 12, but differs in other respects. In this implementation, backlight 42' includes a plurality of stacked-up waveguides 44', each configured to receive light from the plurality of injection optics 54. Each waveguide includes an edge face 50, where light from the injection optics is received.

Figure 8:
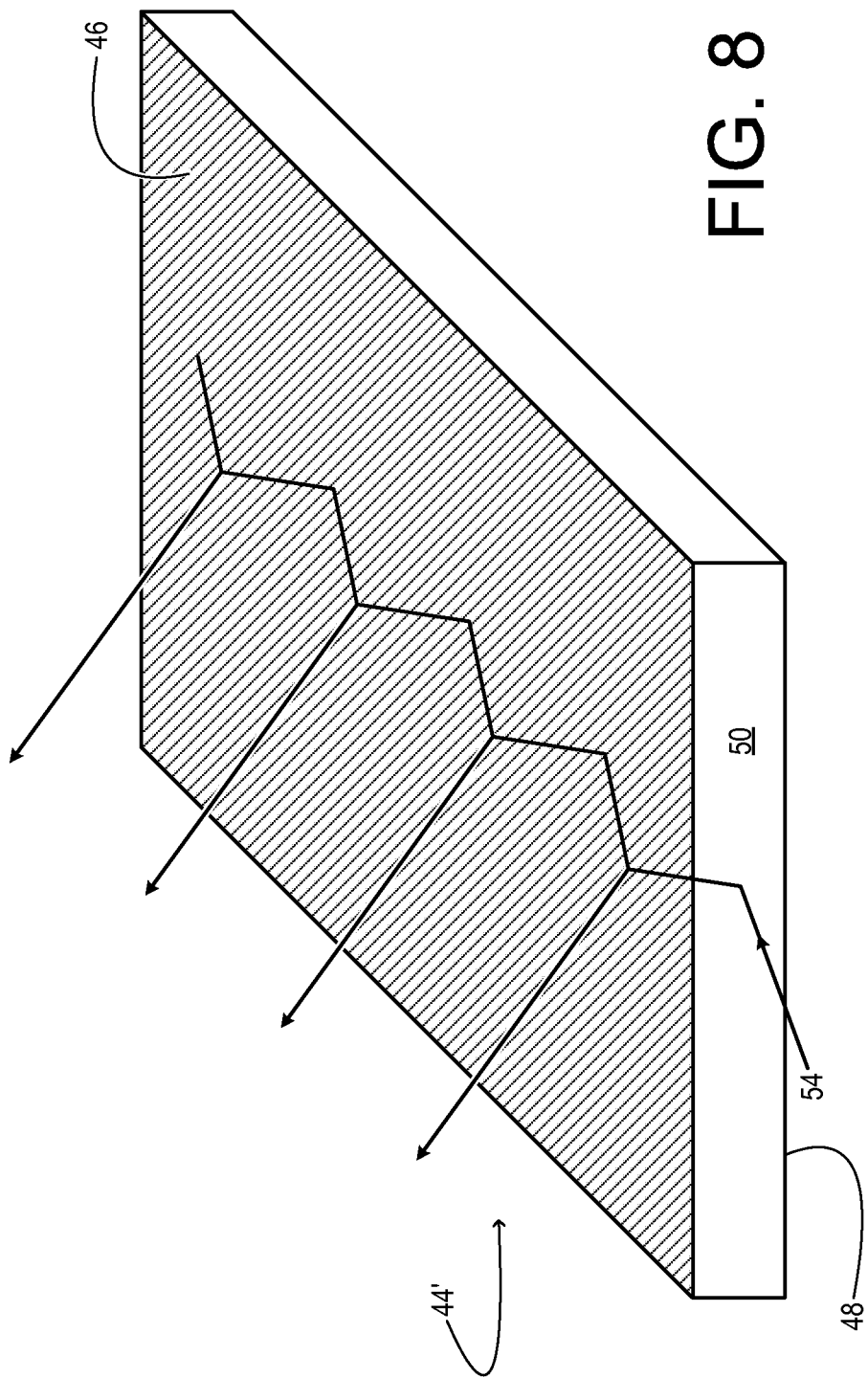
FIG. 8 represents another example light-extraction layer of an LCD backlight.

FIG. 8 shows aspects of a waveguide 44' in one, non-limiting implementation. As in the previous implementation, each waveguide 44' includes a light-extraction layer 52' arranged on its front face 46. However, the light-extraction layer of waveguide 44' need only include a single diffraction grating. The diffraction grating to be used with waveguide 44' may be a surface-relief grating, in one implementation. In other implementations, other types of holograms may be used. The grating or other hologram of light-extraction layer 52' may be configured to release light in one direction when excited by the light propagating through the waveguide. Nevertheless, the configuration of FIGS. 7 and 8 may be used to controllably direct display light in any number of directions, because any number of waveguides 44' may be stacked together and configured to receive light from injection optics 54: each light-extraction layer 52' may release light in a different direction, so that the light released from the series of waveguides spans a desired range.

As in the previous implementation, the useful directions may lie in horizontal planes orthogonal to the plane of display 12' and span a range of horizontal-plane angles. In one example, thirty waveguides may be used for each of three wavelengths of light. The horizontal-plane angles may range from 60 to 120 degrees in increments of 2 degrees, with other ranges and increments contemplated as well. As in the previous implementation, the direction of release of the display light may be controlled by via the elevation angle C at which light is received from the injection optics 54. In the implementation of FIGS. 7 and 8, however, the mode by which the elevation angle affects the direction of release of light is different. In this implementation, light from the injection optics is directed into a given waveguide over a prescribed range of elevation angles. Outside the prescribed range of elevation angles, light from the injection optics may be directed into another waveguide instead. Thus, the elevation angle controls which waveguide is supplied light, which controls which hologram is excited, which in turn controls the direction of release of the light.

The different hologram-selection approaches described hereinabove are usable together in some configurations. In other words, a given backlight may include a plurality of waveguides in a stacked configuration, with at least one of the waveguides supporting two or more holograms. For example, a single waveguide may support three different holograms—to diffract red, green, and blue light when excited at the same range of reflection angles. Such holograms may include Bragg gratings or other volume holograms, and/or surface-relief gratings. Furthermore, although the drawings and description hereinabove feature various LCD displays and associated componentry, this aspect should not be construed to limit the scope of the disclosure. Rather, the light-directing approaches here disclosed may apply to any type of display that uses a backlight—e.g., displays based on electro-wetting.

The configurations described above enable various methods to concentrate light from a display into a pupil of a viewer of the display. Some such methods are now described, by way of example, with continued reference to the above configurations. It will be understood, however, that the methods here described, and others within the scope of this disclosure, may be enabled by different configurations as well.

Figure 9:
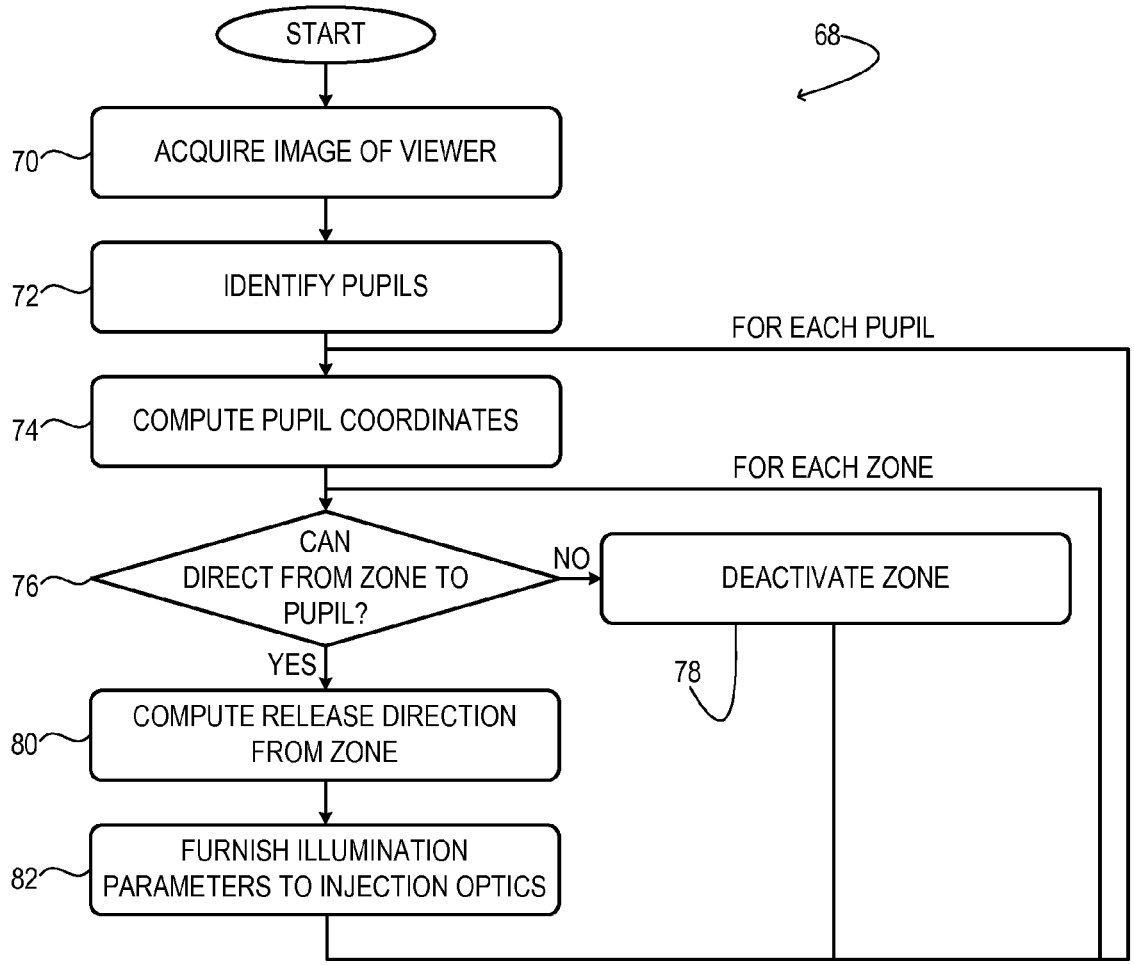
FIG. 9 illustrates an example method to concentrate light from a display into a pupil of a viewer of the display.

FIG. 9 illustrates an example method 68 to concentrate light from a display into a pupil of a viewer of the display. The method is enacted in a computer system operatively coupled to the display and to an imaging system. As noted above, the imaging system may be configured to acquire an image of anyone viewing the display. Accordingly, at 70 of method 68, an image of one or more viewers of the display is acquired. At 72, the pupils of the one or more viewers are identified in the acquired image.

At 74, method 68 begins looping through each of the pupils identified. For each pupil, the coordinates of the pupil are computed based on the acquired image in a pupil-tracking engine of the computer system. The computed coordinates are used, ultimately, to determine the desired direction of release of light from the display. To that end, there may be provided, for each pupil identified, a time window during which the light injected into the waveguide is at an angle to cause excitation of the volume hologram that concentrates light towards that pupil.

As described hereinabove, the display in some implementations is divided into zones from which light is directed independently into the viewers' pupils, where light is injected into the waveguide at a different angle for each zone. Depending on the size of the display, the location of the viewer relative to the display, the acceptance cone of the viewer's pupil, and the maximum angle of release from the display, it may be the case that not every display zone is capable of projecting light into every identified pupil. Accordingly, at 76 method 68 encounters a second loop nested within the first. Here, the method loops through each zone of the display. For each zone, it is determined whether light from that zone can be directed to the pupil whose coordinates have just been computed. If the light cannot be directed from the zone to the pupil, then the method advances to 78, where the zone is deactivated to save power. However, if it is determined that light can be directed from the zone to the pupil, then the method advances to 80, where a direction for release of light from that zone is computed based on the coordinates of the pupil.

The particular approach taken to compute the release direction based on the pupil coordinates may differ in the different implementations of this disclosure. Returning to FIG. 3, the reader will appreciate that for display implementations such as 12D, in which the display zones run vertical, the display-directing engine may compute a release direction based on a horizontal position of a pupil relative to the display. However, for display implementations such as 12F, in which the display zones run horizontal, the display-directing engine may compute the release direction based on the vertical position of the pupil relative to the display. In some cases, the vertical positions of each of a viewer's pupils may be averaged together to determine the appropriate release direction.

At 82, appropriate injection parameters are computed based on the desired release direction and are furnished to the injection optics of the display. In this manner, light is injected into the waveguide at an injection angle to cause the light to reflect from front and back faces of the waveguide at a reflection angle to excite one of a plurality of volume holograms arranged on or within the waveguide—i.e., the one that provides the desired direction of release of display light for the current time window.

As evident from the foregoing description, the methods and processes described herein may be tied to a computing system of one or more computing machines. Such methods and processes may be implemented as a computer-application program or service, an application-programming interface (API), a library, and/or other computer-program product.

Shown in FIG. 2 in simplified form is a non-limiting example of a computer system 10 used to support the methods and processes described herein.

Logic machine 20 of computer system 10 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Logic machine 20 may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Instruction-storage machine 22 includes one or more physical devices configured to hold instructions executable by the associated logic machine 20 to implement the methods and processes described herein. When such methods and processes are implemented, the state of the instruction-storage machine may be transformed—e.g., to hold different data. The instruction-storage machine may include removable and/or built-in devices; it may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. An instruction-storage machine may include volatile, nonvolatile, dynamic, static, read/write, read-only, random-access, sequential-access, location-addressable, file-addressable, and/or content-addressable devices.

It will be appreciated that each instruction-storage machine 22 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 20 and instruction-storage machine 22 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms 'module,' 'program,' and 'engine' may be used to describe an aspect of a computer system implemented to perform a particular function. In some cases, a module, program, or engine may be instantiated via a logic machine executing instructions held by an instruction-storage machine. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms 'module,' 'program,' and 'engine' may encompass individual or groups of executable files, data files, libraries, drivers, scripts, database records, etc.

It will be appreciated that a 'service', as used herein, is an application program executable across multiple user sessions. A service may be available to one or more system components, programs, and/or other services. In some implementations, a service may run on one or more server-computing devices.

It will be understood that the configurations and/or approaches described herein are exemplary in nature, and that these specific implementations or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A display comprising:
an optical waveguide;
a light-extraction layer arranged on or within the waveguide;
an injection optic configured to vary and control an elevation angle at which light is injected into the waveguide, the elevation angle influencing a reflection angle through which the light internally reflects from opposing front and back faces of the waveguide; and
a plurality of holograms arranged in the light-extraction layer in different orientations relative to the front and back faces of the waveguide, each hologram being configured to release a portion of the light from the waveguide in a different, predetermined direction when such portion is received at a different, predetermined excitation angle, the orientation of each hologram being such that the reflection angle determines whether the portion is received at the predetermined excitation angle.

2. The display of claim 1, wherein the light-extraction layer is arranged on the front or back face of the waveguide.

3. The display of claim 1, wherein the waveguide includes an edge face adjacent the front and back faces, and wherein the injection optic is configured to inject the light into the edge face.

4. The display of claim 1, wherein each of the plurality of holograms is a grating hologram, and wherein the waveguide is one of a plurality of stacked waveguides each supporting a different grating hologram.

5. The display of claim 1, wherein the waveguide includes a plurality of display zones and a corresponding plurality of independently controlled injection optics provided for each zone.

6. The display of claim 5, wherein the plurality of holograms are volume holograms superposed in the light-extraction layer.

7. The display of claim 6, wherein each volume hologram is a Bragg grating.

8. The display of claim 5, wherein the plurality of holograms extends across the plurality of display zones.

9. The display of claim 1, wherein the injection optic includes red, green, and blue lasers emitting onto a movable mirror, and wherein the elevation angle is varied and controlled via deflection of the mirror.

10. The display system of claim 4, wherein each of the plurality of holograms is a single diffraction grating or surface relief grating.

11. The display of claim 4 wherein the elevation angle is varied and controlled so as to determine which of the plurality of waveguides receives the light from the injection optic.

12. A display comprising:
an optical waveguide;
a light-extraction layer arranged on or within the waveguide;
an injection optic configured to vary and control an elevation angle at which light is injected into the waveguide, the elevation angle influencing a reflection angle through which the light internally reflects from opposing front and back faces of the waveguide;
a plurality of holograms arranged in the light-extraction layer in different orientations relative to the front and back faces of the waveguide, each hologram being configured to release a portion of the light from the waveguide in a different, predetermined direction when such portion is received at a different, predetermined excitation angle, the orientation of each hologram being such that the reflection angle determines whether the portion is received at the predetermined excitation angle;
a liquid-crystal layer with an array of pixels positioned in front of the waveguide, the liquid-crystal layer controlling a transmission of the light through each pixel of the array;
a camera configured to acquire an image of a viewer of the display; and
a display-directing engine configured to control the injection optic such that the elevation angle is varied based on the image, so that a direction of release of the light from the waveguide is toward a pupil of the viewer.

13. The display of claim 12, wherein the camera is a depth camera configured to resolve distance to the pupil.

14. The display of claim 12, further comprising a pupil-tracking engine configured to compute coordinates of the pupil, wherein the coordinates of the pupil include distance to the pupil.

15. The display of claim 12, wherein the waveguide includes a plurality of display zones and a corresponding plurality of independently controlled injection optics provided for each display zone.

16. The display of claim 15, wherein the display zones run vertical, and wherein the elevation angle is varied responsive to a horizontal position of the pupil relative to the display.

17. The display of claim 15, wherein the display zones run horizontal, and wherein the elevation angle is varied responsive to a vertical position of the pupil relative to the display.

18. Enacted in a computer system having a display, a method to concentrate light into a pupil of a viewer of the display, the method comprising:
    acquiring an image of the viewer;
    recognizing a position of the pupil based on the image;
    computing a direction for release of light based on the position of the pupil; and
    controlling a variable elevation angle at which light is injected into a waveguide to cause the light to reflect internally from opposing front and back faces of the waveguide through a reflection angle which excites one of a plurality of holograms arranged in a light-extraction layer of the waveguide, the excited hologram being configured to release the light in the computed direction for release.

19. The method of claim 18, wherein the waveguide includes plurality of display zones, wherein light is injected into the waveguide at a different elevation angle for each display zone, and wherein the pupil is one of a plurality of pupils of one or more viewers of the display, the method further comprising:
    providing, for each pupil, a time window during which the light is injected into the waveguide at an elevation angle to cause excitation of a hologram that concentrates light toward that pupil.

20. The method of claim 18, wherein the waveguide includes plurality of display zones, and wherein light is injected into the waveguide at a different elevation angle for each display zone, the method further comprising, for each pupil, deactivating a display zone from which light cannot be directed into that pupil.

* * * * *